United States Patent
Fotta et al.

(10) Patent No.: US 8,249,232 B2
(45) Date of Patent: *Aug. 21, 2012

(54) SYSTEM AND METHOD FOR CONTROL OF COMMUNICATIONS CONNECTIONS

(75) Inventors: Keith A. Fotta, Duxbury, MA (US); Richard P. Boudrieau, Duxbury, MA (US)

(73) Assignee: Gryphon Networks Corp., Norwood, MA (US)

( * ) Notice: Subject to any disclaimer, the term of this patent is extended or adjusted under 35 U.S.C. 154(b) by 1310 days.

This patent is subject to a terminal disclaimer.

(21) Appl. No.: 10/820,452

(22) Filed: Apr. 8, 2004

(65) Prior Publication Data

US 2005/0226151 A1    Oct. 13, 2005

(51) Int. Cl.
*H04M 3/00*    (2006.01)
*H04M 1/66*    (2006.01)

(52) U.S. Cl. .......................................... 379/196; 379/200

(58) Field of Classification Search . 705/1; 379/266.07, 379/196–198, 200, 207.13, 210.02; 709/225
See application file for complete search history.

(56) References Cited

U.S. PATENT DOCUMENTS

| | | | |
|---|---|---|---|
| 5,499,289 A * | 3/1996 | Bruno et al. | 379/266.07 |
| 5,960,073 A * | 9/1999 | Kikinis et al. | 379/265.04 |
| 5,999,932 A | 12/1999 | Paul | |
| 6,049,782 A | 4/2000 | Gottesman et al. | |
| 6,052,709 A | 4/2000 | Paul | |
| 6,081,591 A | 6/2000 | Skoog | |
| 6,081,592 A | 6/2000 | Battle | |
| 6,092,099 A | 7/2000 | Irie et al. | |
| 6,130,937 A * | 10/2000 | Fotta | 379/200 |
| 6,249,575 B1 | 6/2001 | Heilmann et al. | |
| 6,321,267 B1 | 11/2001 | Donaldson | |
| 6,330,317 B1 * | 12/2001 | Garfinkel | 379/196 |
| 6,493,007 B1 | 12/2002 | Pang | |
| 6,643,686 B1 | 11/2003 | Hall | |
| 6,788,773 B1 | 9/2004 | Fotta | |
| 6,853,717 B1 * | 2/2005 | Frentz et al. | 379/210.02 |
| 7,020,259 B2 | 3/2006 | Hussain et al. | |
| 7,023,980 B2 | 4/2006 | Lenard | |
| 7,158,630 B2 | 1/2007 | Fotta et al. | |
| 7,162,474 B1 | 1/2007 | Harker et al. | |
| 7,194,075 B2 | 3/2007 | Fotta | |
| 7,212,620 B1 | 5/2007 | Mastro | |
| 7,215,760 B2 | 5/2007 | Lenard | |
| 7,333,798 B2 | 2/2008 | Hodge | |

(Continued)

FOREIGN PATENT DOCUMENTS

EP    0 946 022 A2    9/1999

(Continued)

OTHER PUBLICATIONS

"Do Not Call", presented by Mutual of Omaha, pp. 1-4 (2004).

(Continued)

*Primary Examiner* — Yuwen Pan
*Assistant Examiner* — Sonia Gay
(74) *Attorney, Agent, or Firm* — Hamilton, Brook, Smith & Reynolds, P.C.

(57) ABSTRACT

A method and system for selectively prohibiting a communications connection between an origin and destination in a communications network based on one or mediations rules and one or more lists of prohibited and exempted destination identifiers either in real-time using a control unit or with a pre-check using an analysis unit.

95 Claims, 7 Drawing Sheets

U.S. PATENT DOCUMENTS

| | | |
|---|---|---|
| 7,412,049 B1 | 8/2008 | Koch |
| 7,461,263 B2 | 12/2008 | Prince |
| 7,474,741 B2 | 1/2009 | Brunson et al. |
| 7,536,437 B2 | 5/2009 | Zmolek |
| 7,574,471 B2 | 8/2009 | Fotta et al. |
| 8,005,200 B2 | 8/2011 | Fotta et al. |
| 8,050,394 B2 | 11/2011 | Fotta et al. |
| 2002/0075303 A1 | 6/2002 | Thompson et al. |
| 2002/0152272 A1 | 10/2002 | Yairi |
| 2002/0169954 A1 | 11/2002 | Bandini et al. |
| 2003/0041126 A1 | 2/2003 | Buford et al. |
| 2003/0074286 A1 | 4/2003 | Rodrigo |
| 2003/0074397 A1 | 4/2003 | Morin et al. |
| 2003/0093320 A1 | 5/2003 | Sullivan |
| 2003/0126218 A1 | 7/2003 | Sakonsaku |
| 2003/0132972 A1 | 7/2003 | Pang |
| 2003/0135737 A1 | 7/2003 | Bouthors |
| 2003/0212566 A1* | 11/2003 | Fergusson et al. ............. 705/1 |
| 2003/0217079 A1 | 11/2003 | Bakalash et al. |
| 2004/0066926 A1* | 4/2004 | Brockbank et al. ...... 379/207.13 |
| 2004/0109557 A1 | 6/2004 | Lenard |
| 2004/0114747 A1* | 6/2004 | Trandal et al. ........... 379/211.02 |
| 2004/0148506 A1* | 7/2004 | Prince ........................... 713/176 |
| 2005/0031107 A1 | 2/2005 | Fotta |
| 2005/0074114 A1 | 4/2005 | Fotta et al. |
| 2005/0144279 A1* | 6/2005 | Wexelblat ................... 709/225 |
| 2005/0177599 A1* | 8/2005 | Goodman ................. 707/104.1 |
| 2005/0226151 A1 | 10/2005 | Fotta et al. |
| 2005/0226221 A1 | 10/2005 | Fotta et al. |
| 2005/0249209 A1 | 11/2005 | Fotta et al. |
| 2006/0159060 A1 | 7/2006 | Fotta et al. |
| 2007/0136789 A1 | 6/2007 | Fotta et al. |
| 2011/0280386 A1 | 11/2011 | Fotta et al. |

FOREIGN PATENT DOCUMENTS

| | | |
|---|---|---|
| EP | 1 503 604 A2 | 2/2005 |
| JP | 64-054853 | 3/1989 |
| JP | 02-312430 | 12/1990 |
| JP | 2001-203793 A | 7/2001 |
| JP | 2003-289376 A | 10/2003 |
| JP | 2004-140733 A | 5/2004 |
| JP | 2004-274256 | 9/2004 |
| JP | 2005-056419 A | 3/2005 |
| WO | WO 98/51062 A1 | 11/1998 |
| WO | WO 03/054764 A1 | 7/2003 |
| WO | WO 03/107644 A1 | 12/2003 |
| WO | WO 2006/115909 A1 | 11/2006 |
| WO | WO 2007/041436 | 4/2007 |

OTHER PUBLICATIONS

"Do-Not-Call Compliance", presented by VeriSign, pp. 1-7 (2004).
"Managing inbound spam in Lotus Domino 6," presented by Lotus Developer Domain, pp. 1-28.
"InboxMaster™" brochure, from Secluda Technologies, Inc.™ (11 pp) (2003).
Office Action, Mail Date Jun. 23, 2009, U.S. Appl. No. 11/302,958.
Office Action, Mail Date Feb. 4, 2009, U.S. Appl. No. 11/021,564.
Office Action, Mail Date Jan. 9, 2009, U.S. Appl. No. 11/111,494.
Office Action, Mail Date Jul. 20, 2009, U.S. Appl. No. 11/111,494.
Office Action, Mail Date Dec. 28, 2009, U.S. Appl. No. 11/242,614.
Myers, J., "Network Working Group, Request for Comments," 2222:1-16 (Oct. 1997); http://www.ietf.org/rfc/rfc222.txt, Nov. 11, 2003.
Myers, J., "Network Working Group, Request for Comments," 2554:1-11 (Mar. 1999).
Franks, J., et al., "Network Working Group, Request for Comments," 2617:1-34 (Jun. 1999) http://www.ietf.org/rfc/rfc2617.txt?number=2617, Nov. 11, 2003.
International Search Report, International Appl. No. PCT/US2006/014584, mailed Jul. 27, 2006.
International Preliminary Report on Patentability, International Appl. No. PCT/US2006/014584, issued Oct. 23, 2007.
International Search Report from International Application No. PCT/US2006/038322, mailed Jan. 22, 2007.
International Preliminary Report on Patentability, International Appl. No. PCT/US2006/038322, mailed Apr. 17, 2008.
Communication pursuant to Article 94(3) EPC, dated Dec. 3, 2009 EP 06 750 590.9.
International Search Report from International Application No. PCT/US05/31435 dated Feb. 24, 2006.
Office Action dated Oct. 27, 2009, U.S. Appl. No. 11/021,564.
Office Action dated Mar. 21, 2008, issued in U.S. Appl. No. 11/111,494.
Office Action dated Jun. 25, 2009, issued in U.S. Appl. No. 11/242,614.
Office Action dated Jan. 6, 2010, issued in U.S. Appl. No. 11/302,958.
Office Action dated Aug. 3, 2010, issued in U.S. Appl. No. 11/111,494.
Office Action dated Aug. 13, 2010, issued in U.S. Appl. No. 11/242,614.
Final Office Action dated Jul. 21, 2010, issued in U.S. Appl. No. 11/302,958.
Office Action dated Apr. 26, 2010, U.S. Appl. No. 11/021,564.
Office Action dated Mar. 11, 2010, U.S. Appl. No. 11/111,494.
Office Action dated Oct. 15, 2010, U.S. Appl. No. 11/021,564.
Office Action dated Jan. 19, 2011, U.S. Appl. No. 11/111,494.
Notice of Allowance dated Feb. 2, 2011, U.S. Appl. No. 11/242,614.
Notice of Allowance dated Apr. 18, 2011, U.S. Appl. No. 11/021,564.
Final Office Action dated May 24, 2011, U.S. Appl. No. 11/111,494.
Notice of Allowance dated Jun. 23, 2011, U.S. Appl. No. 11/242,614.
Office Action dated Oct. 12, 2011, U.S. Appl. No. 13/187,943 (3682.1001-016).

* cited by examiner

SYSTEM AND METHOD FOR CONTROL OF COMMUNICATIONS CONNECTIONS

BACKGROUND

Recently, federal and state solicitation laws and regulations have mandated that a consumer, who expresses a desire not to be solicited by telephone or other electronic media such as electronic mail, not be called or e-mailed. By regulation, such as the United States Federal Trade Commission's (FTC) Telemarketing Sales Rules (TSR), a business must maintain a list of telephone numbers for such consumers, known as a "Do-Not-Call" (DNC) list, and take appropriate measures to ensure that outgoing calls to telephone numbers on a DNC list are somehow blocked. The federal government is also considering the establishment of a federal "Do-Not-E-Mail" list to enable a consumer to prevent electronic mail solicitations.

The DNC lists can include one or more lists specific to a particular business, as well as state-wide, national and industry-imposed lists such as the Direct Marketing Association (DMA) Telephone Preference Service (TPS) list. A single violation of a federal and/or State DNC regulation may result in a substantial fine. Thus, DNC compliance management is a particularly critical and challenging issue for businesses that rely on telephone solicitations as a core marketing tool.

SUMMARY

There exists systems for handling DNC compliance management. However, there is a need for a more flexible approach that can accommodate cases in which a blocked or prohibited number may still be reached based on certain exemptions to the regulations.

The present invention provides certain improvements and advantages over the prior art. In one aspect, the present invention provides a method and system of selectively prohibiting a communications connection between an origin and destination in a communications network based on one or more mediation rules and one or more lists of prohibited and exempted destination identifiers. The origin and destination may be communications devices directly or indirectly connected to the communications network such as telephones, cellular telephones, personal digital assistances, pagers, computers, computer client interfaces, or remote computer terminals.

In an embodiment, a connection unit may be used that receives or initiates a request for a communications connection between an origin and destination by sending a request to the control unit and receiving an order from the control unit to prohibit or allow the communications connection based on the destination identifier. The connection unit may be an Interactive Voice Response (IVR) application, a predictive dialer server, a distributed predictive dialer system, a switch, router, or an electronic mail server.

The connection unit typically provides a bridging capability to establish a communications connection between an origin and destination. The destination identifier may be a communications device address such as a domestic or international telephone number, Internet Protocol address, or an electronic mail address. "Prohibited" destination identifiers may be identifiers that have been designated by a governmental authority, private organization, client, customer, or other party as blocked or prohibited from being connected to or contacted by a particular client or all clients. "Exempted" destination identifiers may be identifiers that have been designated by a governmental authority, private organization, client, customer, or other party as being exempted from being a prohibited destination identifier.

The prohibited and exempted destination identifier lists may be contained within one or more tables of one or more databases. Also, the lists of prohibited destination identifiers may be derived from any one or a combination of a Federal Do-Not-Call list, a State Do-Not-Call list, a DMA Do-Not-Call list, a client internal list, a Very Important Person list, and other defined lists. Furthermore, the lists of exempted destination identifiers may be derived from any one or a combination of an Existing Business Relationship (EBR) exemption list, Do-Not-Call exemption list, State Do-Not-Call exemption list, a VIP exemption list, and other exemption lists. The exemption lists may also contain any one or combination of exemption key, type, and date of contact associated with each exempted destination identifier.

Mediation rules may be used to determine a sequence of comparisons made between a destination identifier and one or more lists of exempted and prohibited identifiers wherein each comparison with a list of exempted identifiers determines whether the comparison with an associated list or lists of prohibited destination identifiers is bypassed or ignored. An associated list of prohibited destination identifiers is "bypassed" when the comparison with the prohibited destination list is not performed. An associated list of prohibited destination identifiers is "ignored" when the comparison with the prohibited destination list is performed, but no action to control the communications connection based on the result is taken. The result is only logged in an audit record for some other purpose such as record keeping or performing a statistical analysis of the control system. If the prohibited destination list is not bypassed or ignored, a comparison is performed, resulting in an action to possibly prohibit or allow the communications connection. The prohibited and exempted destination lists may be modified from an origin or a secondary interface such as a World-Wide-Web (WWW) connection from a remote computer or an automated remote process from a client site.

The control unit may be a computer server that resides on the premises of a client, a local exchange carrier, local administration facility, central administration facility, or other remote facility. The control unit may interface with local prohibited and exempted destination lists. These local prohibited and exempted destination lists may be periodically synchronized with other prohibited and exempted destination lists that are remotely located at another facility such as a local administration facility, local exchange carrier, central administration facility, or another facility.

The control unit may also be a software application within a remote client computer that accesses an internal or remote prohibited and exempted lists within a central administration facility.

The prohibited and exempted destination lists may be dynamically added or removed and the mediation rules updated to flexibly adapt the system to continuously support new connection prohibition rules. Also, multiple destination identifiers may be examined in relation to a particular origin to determine whether to prohibit or allow a communications connection between the origin and each of the multiple destinations. For security reasons, each client user may be identified and authenticated.

The control unit, based on the mediation rules, may also use additional client and customer information to determine whether to prohibit or allow a communications connection such as a client user identifier, client identifier, customer identifier, client office identifier, product identifier, geographic area, date, time, exemption type duration, origin identifier, internal client criteria, or internal customer criteria. The control unit may also generate logs of communications connections having prohibited, allowed, and improper destination identifiers.

The present invention also includes an analysis system and method for selectively designating whether a communications connections between an origin and one or more destinations are prohibited. The analysis system typically includes an interface unit that receives one or more proposed destination identifiers, at least one list of prohibited destination identifiers, at least one list of exempted destination identifiers, and an analysis unit that designates whether the communication connection between an origin and one or more proposed destinations are prohibited or allowed based on one or more mediation rules and the list of prohibited and exempted destination identifiers.

While the control unit provides real-time control of a communications connection, the analysis unit performs a precheck of one or more proposed destination identifiers and generates a list that designates which destination identifiers are prohibited or allowed. A client user or agent may then review the list and decide which destinations to contact. The analysis unit is likely preferred by small business clients with a smaller customer base and less resources to contact customers. The analysis unit may reside at the central administration facility and be remotely accessed by a client. Alternatively, the analysis unit may be a computer application within a client's computer system that accesses a remote or internal list of prohibited and exempted destination identifiers.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
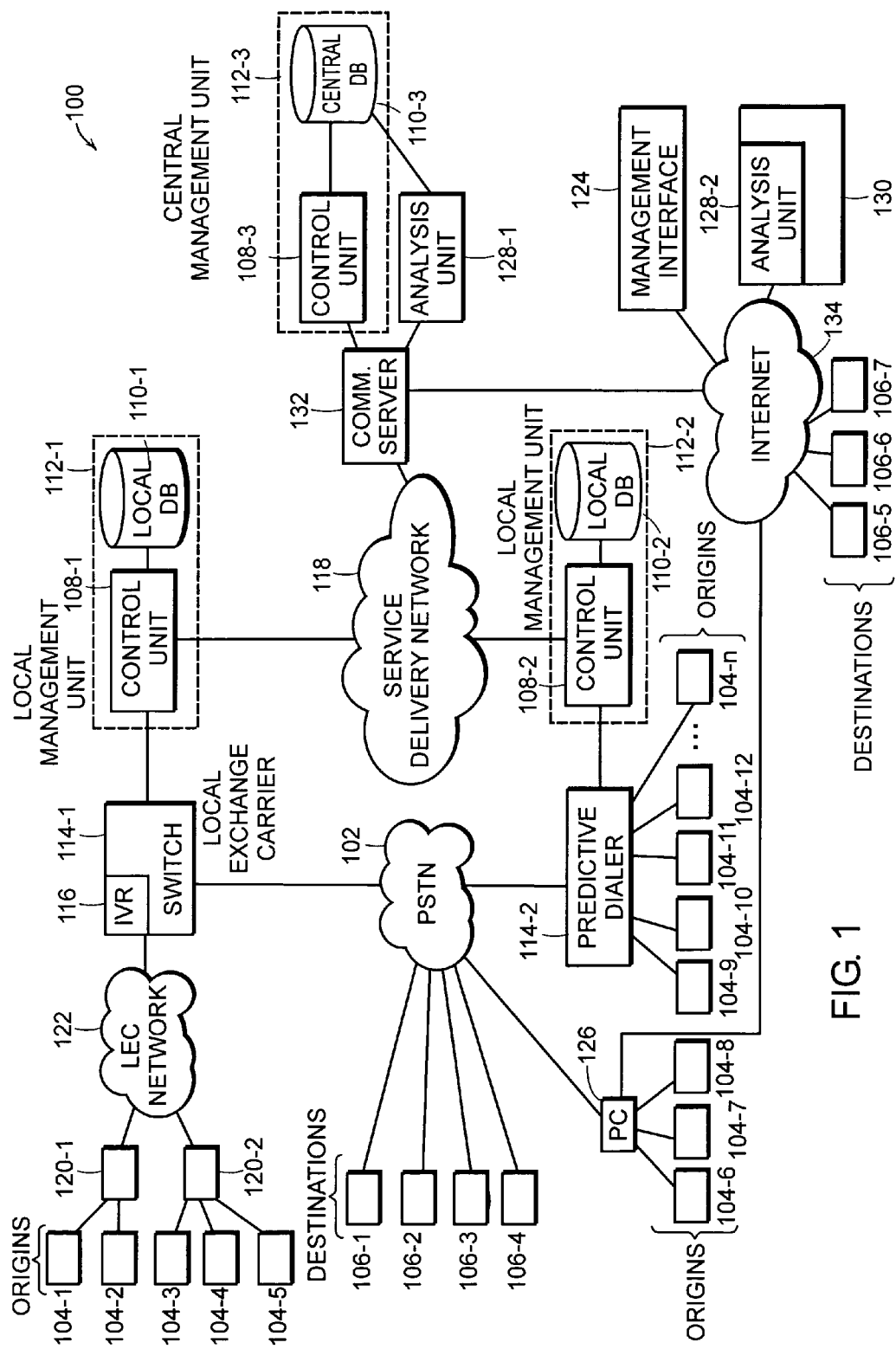
FIG. 1 is a schematic diagram showing the communications control system of the present invention.

One embodiment of the present invention is a control system for selectively prohibiting a communications connection between an origin and a destination in a communications network. FIG. 1 shows an example of a control system 100 interconnected with telecommunications network 102, i.e., the Public Switched Telecommunications Network (PSTN), that illustrates principles of the present invention. It is understood, however, that the present invention applies to any communications system and, more particularly, to allowing or prohibiting a communications connection between an origin and destination therein.

To selectively prohibit or allow a communications connection between an origin 104 and destination 106, preferably in real-time or near real-time, a control unit 108 interfaces with a database 110, collectively referred to herein as a management unit 112. The origin 104 and destination 106 are typically telephones, but may be other types of communications devices such as cellular telephones, personal digital assistances, pagers, computers, computer client interfaces, or remote computer terminals. Origin 104 and destination 106 may each be connected directly or indirectly to PSTN 102. For example, origin 104-1 may be connected through office private branch exchange (PBX) 120-1 to local exchange carrier network 122 which connects to local exchange carrier connection unit 114-1, a telecommunications switch.

Figure 2:
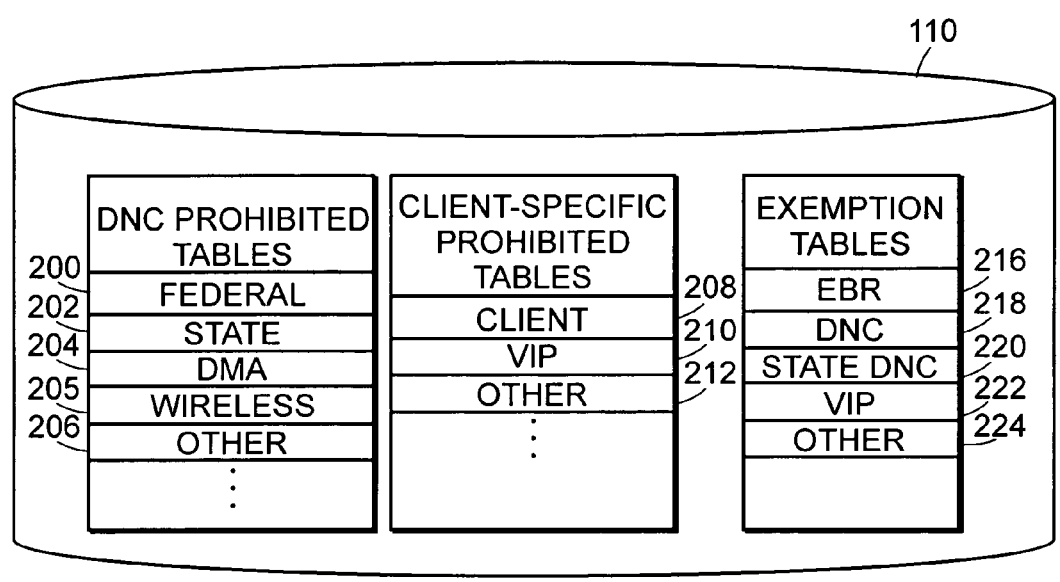
FIG. 2 is a high level diagram of the databases of the communications control system.

The database 110 may have one or more tables of prohibited and exempted destination identifiers as shown in FIG. 2. The tables are shown in three groups for descriptive purposes, but may be arranged in any order or configuration. The DNC prohibited tables are tables that typically are the same for any client and include Federal DNC list 200, State DNC list 202, DMA DNC list 204, Wireless DNC list 205, and other DNC lists 206. The client-specific prohibited DNC tables are typically unique to each client and include Client DNC list 208, VIP DNC list 210, and other DNC list 212. The exemption tables may include EBR exemption list 216, DNC exemption list 218, State DNC exemption list 220, VIP exemption list 222, and other exemption lists 224. The destination identifier is usually a network address associated directly or indirectly with a destination communications device or a destination user. For example, the device address may be a telephone number for a device connected to the PSTN 102, an Internet Protocol (IP) address for a device connected to the Internet, or an electronic mail address for an Internet electronic mail account in an electronic mail server.

Using one or more mediation rules and the lists of prohibited and exempted destination identifiers in database 110, control unit 108 determines whether a communications connection between a particular origin 104 and destination 106 is prohibited or allowed. To facilitate a more rapid response to a communications connection request, management unit 112 may be mirrored at a client's local facility or local carrier exchange. For example, local management unit 112-1, comprising local control unit 108-1 and local database 110-1, may control communications connections established by connection unit 114-1, a telecommunication switch with Interactive Voice Response (IVR) 116. Another local management unit 112-2, comprising local control unit 108-2 and local database 110-2, may control communications connections established by connection unit 114-2, which in this example is a predictive dialer for multiple origins 104 such as 104-9.

A central management unit 112-3, comprising control unit 108-3 and database 110-3, may control communications connections. Central management unit 112-3 may interface with any connection unit 114 via service delivery network 118 or any other remote computer or interface such as computer 126, management interface 124, and computer 130 via network 134 which, in this instance, may be the Internet.

The control unit 108 may be a computer server or gateway that resides on the premises of a client, a local exchange carrier, local administration facility, central administration facility, or other remote facility. Each control unit 108 and database 110 may be periodically synchronized with other control units 108 and databases 110 based on a synchronization mechanism described in International Patent Application PCT/US03/19145, the entire contents of which are incorporated herein by reference. Local databases 110-1 and 110-2 are typically not as large as 110-3 because the local databases may only need lists of prohibited and exempted destination identifiers specific to a local client while database 110-3 typically holds the lists for all clients. While the control unit 108-1 interfaces with local prohibited and exempted destination lists in database 110-1, control unit 108-1 may also interface with other prohibited and exempted destination lists in other databases 110 being remotely located at another facility such as another local administration facility wherein database 110-2 may be located. Control unit 108-1 or other control units 108 may interface remotely with databases 110 located in other locations such as a local exchange carrier, central administration facility, or remote facility.

Central management unit 112-3 and local management units 112-1 and 112-2 typically communicate with each other via Service Delivery Network 118 which may be a private network, a virtual private network within the Internet, a wide area network, local area network, or the like. Service Delivery Network 118 preferably is protected from eavesdropping with adequate security mechanisms such as encryption and authentication.

While FIG. 1 illustrates local management units 112-1 and 112-2 controlling the communications connection between an origin 104 and destination 106 by interfacing with connection units 114-1 and 114-2 respectively, either control unit 108 or both the control unit 108 and database 110 may be incorporated into the functionality of any connection unit 114 such as connection units 114-1 and 114-2, effecting direct control of the communications connection by the control unit 108. From another perspective, control unit 108 itself may establish the communications connection between an origin 104 and destination 106. It may, however, be more advantageous to utilize a separate management unit 112 that interfaces with multiple connection units 114 to reduce the overall cost of implementing communications connection control throughout a communications network.

In addition to being a telecommunications switch having an IVR application or a predictive dialer, connection unit 114 may be a distributed predictive dialer system, a router, a switch, electronic mail server, or a computer server such as a personal computer. The connection unit 114 generally acts as a bridging circuit to establish a communications connection between an origin 104 and destination 106. Further details regarding the operation of the IVR application and its interfacing capabilities with management unit 112 are provided in U.S. Pat. No. 6,130,937, the entire contents of which are incorporated by reference. International Patent Application PCT/US03/19145 also provides additional details regarding the use of an application specific interface (API) and an exemplary network configuration to facilitate communications between connection unit 114 and management unit 112.

The connection unit 114 may receive or initiate a request for a communications connection between an origin 104 and destination 106 that includes the destination identifier. For example, connection unit 114-1, typically uses IVR 116 to receive a call from an origin 104-1. The client user may use origin 104-1, e.g., a telephone, to dial a "1-800" number to obtain access to IVR 116. Once connected, IVR 116 will prompt the client user to enter a pin identification number between 6-10 digits. The control unit 108-1 will then validate the client user, using database 110-1 as belong to a peculiar office associated with the client. If valid, IVR 116 may prompt the client user of origin 104-1 for a 10-digit destination telephone number to subsequently place a call to a target customer. Once the destination telephone number is received, typically using dual-tone-multi-frequency (DTMF) detection, IVR 116 sends the call destination telephone number to local management unit 112-1. Depending on the mediation rules which are preferably specific to a particular client, control unit 108-1 compares the destination telephone number to one or more prohibited and/or exempted destination telephone number lists in local database 110-1 and then orders connection unit 114-1 to prohibit or allow the communications connection.

In this voice communications scenario, the lists of prohibited destination identifiers may be derived from any one or a combination of a Federal DNC list 200, a State DNC list 202, a DMA list 204, a Wireless DNC list 205, a client internal list 208, or a Very Important Person (VIP) DNC list 210 as shown in FIG. 2. Other lists 206 defined by International, Federal, State, other governmental entities, trade organizations, associations, or private entities may also be included. Other client-specific lists 212 may further be included. In an electronic mail scenario, the list of prohibited destination identifiers may include a client do-not-email list, Domain Name List or IP address list.

The Federal DNC list 200 is typically a copy of the national Do-Not-Call list maintained by the FTC and enforced by the FTC, Federal Communications Commission (FCC), and States officials. Preferably, the list 200 is stored locally in database 110-1 to reduce possible query latencies, but may be accessed remotely by control unit 108-1 from central database 110-3 or even from a database maintained by the FTC, FCC, or other entity via the Internet or the like. The National Do-Not-Call list currently has more than 55 million destination telephone numbers.

The state DNC list 202 may include multiple lists with each list associated with a particular state. Depending on the mediation rules, as defined by the client, control unit 108 may check one state, multiple states, or no state list for prohibited destination numbers. The DMA PST list 204 is typically derived from a DMA-maintained do-not-call list which is required by certain states to be checked by telemarketers before calling a target customer. The DMA TPS list currently has more than 8 million destination telephone numbers. A Wireless DNC list 205 may be implemented that contains, for example, a list of cellular telephone or other wireless device addresses such as a telephone numbers, e-mail addresses, IP addresses, or domain name addresses associated with one or more groups of wireless devices.

The client internal DNC list 208 may be a client-specific list that includes destination telephone numbers of customers that have explicitly notified the client that they do not want to be solicited. Client internal DNC list 208 generally trumps all other lists or exemptions. The VIP list 210 may be a client-specific list typically of high value customers that the client does not want general client users or brokers to contact. The other client-specific DNC lists 212 may include a list of states or area codes associated with a particular agent that are prohibited or blocked from contact by the agent. The other client-specific DNC lists 212 may also include lists of area codes associated with particular client offices which are prohibited from contact by the office. The client agent or office restrictions allow a client to possibly prevent agents from different offices in different geographic locations from calling the same customers in a particular state or area code.

The lists of exempted destination identifiers may be derived from any one or a combination of a Existing Business Relationship (EBR) exemption list 216, DNC exemption lists 218, State DNC exemption lists 220, a VIP exemption list 222, or other exemption lists 224.

The EBR exemption list 216 is typically a client-specific list of destination identifiers of customers that may be contacted even though their destination number is contained within DNC list 200, State DNC list 202, or DMA DNC list 204. Under certain condition, depending on the existing business relationship between the client and a customer, certain federal and state regulations allows a particular client to contact a customer even though the customer's destination number is included within list 200, 202, or 204. The EBR list may include, but not be limited to, the following categories:

1. Purchased—Indicates that a customer has purchased a product from the client. Calls to these customers are permitted within the duration specified in the regulations.
2. Leased—Indicates that a customer has leased a product from the client. Calls to these customers are permitted within the duration specified in the regulations.
3. Rented—Indicates that a customer has rented a product from the client. Calls to these customers are permitted within the duration specified in the regulations.
4. Financial Transaction—Indicates that a customer has engaged in a financial transaction with the client. Calls to these customers are permitted within the duration specified in the regulations.
5. Inquiry—Indicates that a customer has made an inquiry with the client. Calls to these customers are permitted within the duration specified in the regulations.

Each of these exemptions may be defined by federal regulations and some states that have EBR regulations. Clients are typically required to choose which of these exemptions the control system 100 will support/elect. Clients typically provide a list of exempted destination identifiers along with the exemption type to a control system 100 administrator who enters the destination identifiers into the EBR exemption list 216 via interface such as management interface 124 or can be loaded by automated process from a remote client site or sites. Information included within EBR exemption list 216 may include any one or a combination of an exemption key, exemption type, and date of contact associated with each exempted destination identifier.

The EBR exemption key may be an integer associated with a category of EBR exemption. For example, the "Purchased" EBR exemption may have a key=1 as shown above while the "Inquiry" EBR exemption may have an EBR exemption key=5. The date of contact may be stored with the destination identifier in EBR exemption list 216 to enable control unit 108 to determine the duration of time in which a particular EBR exemption may be applied. For example, if a customer made an inquiry to the client on a certain date, federal or state regulations may allow the client to apply the exemption and override the Federal DNC list 200, State DNC list 202, or DMA DNC list 204 for a period of 30 days from the date of contact. The duration of each EBR exemption may be different or vary, requiring the use of an EBR exemption key, associated with each exempted destination number, to determine which EBR exemption applies and for what duration of time that EBR exemption is valid. Thus, the EBR exemption key and date of contact may be used by control unit 108 to identify a particular EBR exemption category and determine whether to apply the EBR exemption, depending on the duration that the exemption is valid from the date of contact.

The DNC exemption lists 218 may be client-specific or agent-specific lists of destination identifiers including, but not limited to, the following categories:

Prior Express Permission—When a customer of a client specifically gives permission to be contacted, the customer's destination identifier, e.g., telephone number, is recorded into database 110, allowing the customer to be contacted by the client. This category may be enabled or disabled by the client using a management interface 124.

Survey—When a customer responds to a client survey, the customer's destination identifier, e.g., telephone number, may be recorded into database 110, allowing the customer to be contacted by the client. This category may be enabled or disabled by the client using a management interface 124.

Personal Relationships—This category allows a client agent to designate certain destination identifiers as their "Friends and Family." Thus, allowing control unit 108 to bypass all DNC restrictions and allow communications connections to the designated destination identifiers. The destination identifier may be added to a personal relationship DNC exemption list 218 via the IVR 116 interface by the client agent or using a WWW interface from management interface 124 or some other remote computer connection to management unit 112. This category may be enabled or disabled by the client using management interface 124.

The State DNC exemption list 220 may be a client-specific list of flags associated with enabling or disabling State call curfews, Intrastate calls, Federal DNC list 200, State DNC lists 202, and DMA DNC list 204. The State DNC exemption list 220 may include, but not be limited, to the following:

Federal flag—this flag setting allows the client to set control unit 108 to ignore checking federal DNC list 200. The setting may be enabled or disabled by the client using management interface 124.

State flag—this setting allows the client to set control unit 108 to ignore state DNC list 202 for a particular state. Each of the 50 possible states may be individually ignored. The setting may be enabled or disabled by the client using management interface 124.

DMA flag—this setting allows the client to set control unit 108 to ignore DMA DNC list 204. The setting may be enabled or disabled by the client using management interface 124.

Intrastate flag—this exemption enables control unit 108 to allow intrastate communications connections to an individual state. For example, if a client believes they are entitled to an exemption allowing them to call into a state (i.e., origin and destination identifiers, e.g., telephone numbers, are from different states), the client may set this option to enable control unit 108 to override any other intrastate restrictions imposed by a state DNC list 202 or other list. The setting may be enabled or disabled by the client using management interface 124.

State Call Curfew flag—this exemption may allow control unit 108 to ignore the curfew restrictions associated with a particular state while following the federal call curfew rules. A call curfew may only allow communications connections within a designated time period such as 9 a.m. to 6 p.m. The federal call curfew rules may be more liberal than the curfew rules in certain states. Thus, the client has the option to follow the more liberal federal rules. The setting may be enabled or disabled by the client using a management interface 124.

The High Value customer (VIP) exemption list 222 may be a agent-specific list of destination identifiers that allows certain agents of a client to establish a communications connection with certain VIP clients. As stated previously, control unit 108 uses VIP DNC list 210 to prohibit a communications connection by agents of a client to certain VIP clients whose destination identifiers are contained in VIP DNC list 210. VIP exemption list 222 enables control unit 108 to bypass the VIP DNC list 210 check for a particular agent and allow that agent to contact the VIP customer. The destination identifiers may be stored in database 110 by the client using management interface 124. The VIP exemption list 222 check may also be enabled or disabled by the client at management interface 124.

Database 110 may also include other exemption lists 224 such as a Federal Grace Period List that defines a grace period wherein newly added destination identifiers to the Federal DNC list 200 may be contacted if they were added during the grace period. For example, the grace period may vary between 0 and 90 days. Control unit 108 may check the other exemption lists 222 such as the Federal Grace Period list depending on whether the check is enabled or disabled by the client using a management interface 124.

While the foregoing lists may preferably be implemented as tables within a database such as databases 110, the lists may also be distributed throughout multiple databases or multiple tables within multiple databases. Also, the prohibited and exempted destination lists within databases 110 may be modified by an agent via an origin 104 using IVR 116. Furthermore, the prohibited and exempted destination lists may be modified from a secondary interface such as management interface 124 or another remote connection to management units 112, typically using a WWW page interface by an agent or administrator.

Having described the various prohibited and exempted destination lists and other exemption lists in the foregoing, the mediation rules used by control unit 108 are now further described. These mediation rules preferably determine whether certain prohibited destination identifier lists are checked by control units 108 or bypassed (or ignored) based on whether certain exempted destination lists or exemption lists are used by control units 108. As described above, the client preferably configures control units 108 to use any combination of DNC lists and/or exemption lists within databases 110. Basically, the mediation rules determine the sequence of comparisons made by control units 108 between a destination identifier and one or more lists of exempted and prohibited identifiers. In that sequence, each comparison with a list of exempted identifiers by control units 108 determines whether a comparison with an associated list or lists of prohibited destination identifiers is bypassed or ignored.

For example, before comparing a destination identifier with Federal DNC list 200, State DNC lists 202, and DMA DNC list 204, control unit 108 typically compares the destination number with EBR exemption list 216. If there is a match with EBR exemption list 216, control unit 108 bypasses or ignores the result of the comparison with Federal DNC list 200, State DNC lists 202, and DMA DNC list 204. If the client, however, has configured the mediation rules to not use EBR exemption list 216, the control unit 108 compares the destination identifier to the Federal DNC list 200, State DNC lists 202, and DMA DNC list 204. Similarly, VIP exemption list 222 may be checked before control unit 108 checks VIP DNC list 210 to determine whether the VIP DNC list 210 check is bypassed or ignored. The DNC exemption list related to "Friends and Family" may be checked by control unit 108 to determine whether to bypass all other DNC lists except client-specific DNC list 208. State DNC exemption list 220 may be checked prior to checking a particular a State DNC list 202 to determine whether control unit 108 bypasses the particular State DNC list 202. Other check and bypass scenarios are possible depending on the mediation rules. Thus, the mediation rules, which are configured by the client, determine the sequence in which DNC lists may be bypassed or checked by control unit 108 in order to prohibit or allow a communications connection between an origin 104 and destination 106. FIG. 5, which will be discussed in detail later, provides a further illustration of the mediation rules.

In addition to being configured based on mediation rules that determine which prohibited and exempted destination lists or other exemptions are used, control unit 108 may use other information such as a client user identifier, client identifier, customer identifier, client office identifier, product identifier, geographic area, date, time, exemption type duration, origin identifier, internal client criteria, or internal customer criteria to determine whether a particular comparison with a prohibited or exempted destination list or other exemption list is necessary. In other words, control unit 108 may utilize additional information in conjunction with the prohibited and exempted destination lists of database 110 to prohibit or allow a communications connection to occur between an origin 104 and destination 106.

For example, a client agent may present a client user identifier with a password to enable control unit 108 to identify and authenticate the agent's access to the system. The client user identifier may also be used by control unit 108 to determine which particular DNC exemption list 218 to check for "Friends and Family" or which VIP exemption list 222 to check in order to determine whether the communications connection to a high value client should be allowed. Control unit 108 may also check the dialed number (DNIS) or origin identifier, e.g. telephone number, using Automatic Number Identification (ANI) to determine whether a particular agent is prohibited from making a communication connection with a destination having a particular area code according to DNC list 212. The client office identifier, which may also be determined by agent input from an origin 104 or automatically using ANI, may also be used, based on the mediation rules, to check DNC list 212 to determine whether a destination number is restricted.

Figure 3:
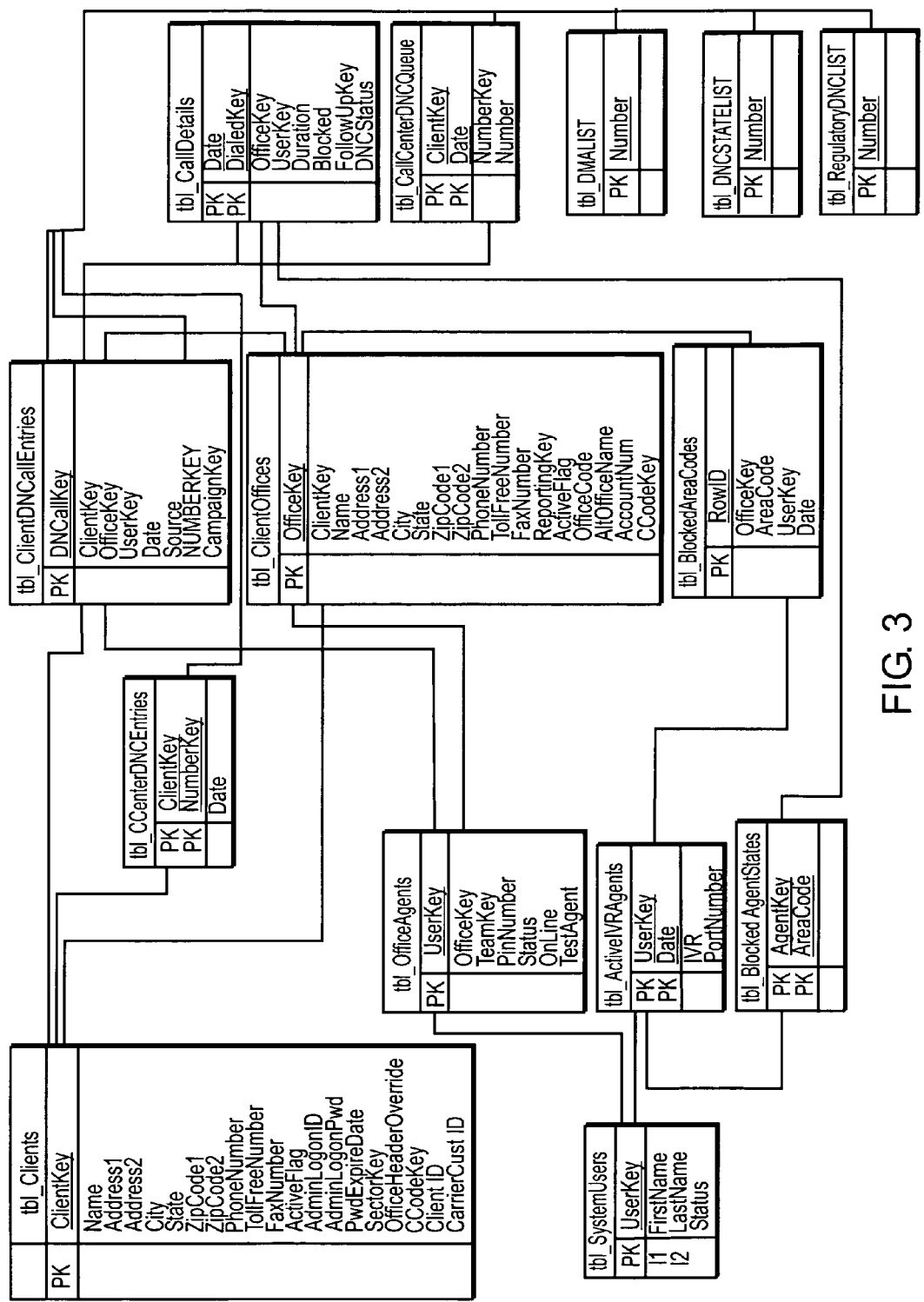
FIG. 3 is a block diagram of a DNC database that stores and manages DNC data for multiple clients.
Figure 4:
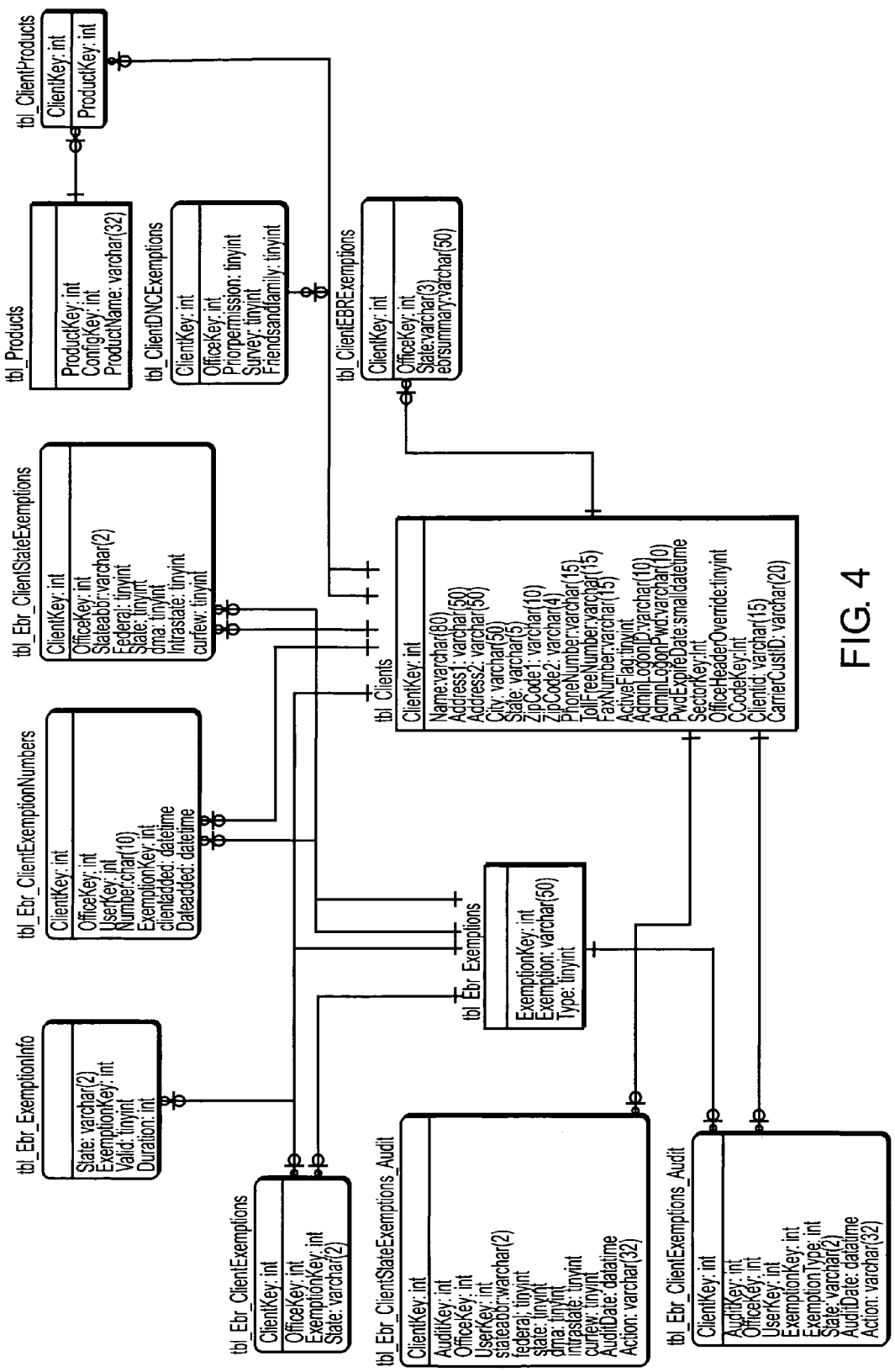
FIG. 4 is a block diagram of a DNC database that stores and manages exemption data for multiple clients.

FIGS. 3 and 4 show an exemplary internal organization of databases 110, which store client-specific specific information, individual office and agent details for each office assigned to the client, and common information for each client of control system 100. Each client is assigned a unique client key that identifies that client to control units 108. Individual client offices may also be assigned a unique office key. Furthermore, each client user or agent may be assigned a unique Personal Identification Number (PIN) and unique client user key. The client key, office key, and user key enable control units 108 to associate the proper prohibited and exempted destination lists to the proper client, client user, or office.

FIG. 3 shows the table organization of the data structure of databases 110 in which the prohibited destination lists are stored. The tables shown are described as follows:

tbl_Clients: a table of all clients using control system 100 including information about each client.

tbl_SystemUsers: a table of all individual users of control system 100 including client users or agents and administrators.

tbl_OfficeAgents: a table of all brokers. This table indicates whether the agent is part of a team, active, and online.

tbl_Active IVRAgents: a table of all agents currently signed on via IVR 116.

tbl_BlockedAgentStates: a table that enables control unit 108 to prohibit certain agents from calling certain states listed in the table.

tbl_BlockedAreaCodes: a table that enables control unit 108 to prohibit certain agents from calling certain area codes.

tbl_ClientOffices: a table of offices assigned to a particular client.

tbl_CCenterDNCEntries: a table that lists the prohibited destination identifiers for a particular call center.

tbl_ClientDNCCallEntries: a table that lists the prohibited destination identifiers for a particular client 208.

tbl_CallDetails: a table that stores details associated with each call to enable logging or auditing.

tbl_CallCenterDNCQueue: a table that stores the database changes that must be sent to other management units 112.

tbl_DMALIST: a table that stores the DMA DNC list 204.

tbl_DNCSTATELIST: a table that stores the state DNC lists 202.

tbl_RegulatoryDNCList: a table containing Federal DNC list 200.

FIG. 4 shows the table organization of the data structure of databases 110 in which exempted destination identifiers are stored. The tables shown are described as follows:

tbl_Clients: a table of all clients using control system 100 including information about each client (same as in FIG. 3).

tbl_Ebr_Exemptioninfo: a table that stores the durations associated with each category exemption.

tbl_Ebr_ClientExemptions: a table that stores exemptions associated with a particular client.

tbl_Ebr_ClientStateExemptions_Audit: a table that stores an audit record of exemptions associated with State DNC exemption list 220.

tbl_Ebr_ClientExemptions_Audit: a table that stores an audit record of exemptions associated with DNC exemption list 218.

tbl_Ebr_Exemptions: a table that describes the EBR exemption of EBR exemption list 216.

tbl_Ebr_ClientExemptionNumbers: a table that stores the list of destination identifiers in EBR exemption list 216 including the exemption key and date of contact information.

tbl_Ebr_ClientStateExemptions: a table that stores the exemption listed in State DNC exemption list 220 associated with a particular client.

tbl_ClientDNCExemptions: a table that stores the DNC exemption list 218 associated with a particular client.

tbl_EBRExemptions: a table that describes that State EBR exemptions.

tbl_Products: a table that describes a product associated with a particular client.

tbl_ClientProducts: a tale that associates a product key to a particular client.

As shown above, the databases 110 are configured using tables such that prohibited and exempted destination lists may be dynamically added or removed. For example, new EBR exemptions may be added to tbl_Ebr_Exemptions with minimal or no modifications to other tables within databases 110. Such flexibility to enable databases 110 updates also allows the mediation rules to be flexibly adapted to continuously support new connection prohibition rules.

Referring again to FIG. 1, the functionality of control units 108 and associated databases 110 may also be implemented as a software application within a remote client computer 126. Alternatively, only control unit 108 may be implemented within client computer 126 while it remotely accesses the prohibited and exempted destination lists within database 110-3, located in a central administration facility. Furthermore, computer 126 may act as a remote interface to any management unit 112. The lower cost implementation may be attractive to certain clients that may not be concerned with the possible latency in accessing database 110-3. In this scenario, client computer 126 acts as both a connection unit and control unit by allowing or prohibiting a communications connection between, for example, origin 104-6 and 106-1 based on the prohibited and exempted destination lists within an internal database 110, or within central database 110-3, or within another remote database. Computer 126, acting as a control unit, may also control the communications connection between origin 104-6 and destination 106-5 which could be a Voice-over-IP (VoIP) connection.

With regard to any control unit 108, it is understood that a plurality of destination identifiers may be examined in relation to a particular origin to determine whether to prohibit or allow a communications connection between a particular origin such as origin 104-2 and each destination of the plurality of destinations 106. Thus, control units 108 may be continuously processing communications connection requests as the client agent attempts to make new contacts with new customers.

Another feature of control system 100 is that management units 112 may maintain audit records of communications connections whether the connection is prohibited or allowed. Instead of simply bypassing a particular check if an associated exemption list check has a match to a destination identifier, control units 108 may perform the check, but only log the results. These logs of prohibited, allowed, and improper destination identifiers may be stored for later analysis or other purposes. The logs may be stored as a flat, excel, or dbf file or the like.

According to the foregoing, the present approach provides a method of selectively prohibiting a communications connection between an origin and destination in a communications network. The method includes receiving or initiating a connection request for a communication connection between an origin 104 and destination 106 that includes the destination identifier and prohibiting or allowing the requested communications connection based on one or more mediation rules and lists of prohibited and exempted destination identifiers in databases 110.

Figure 5A:
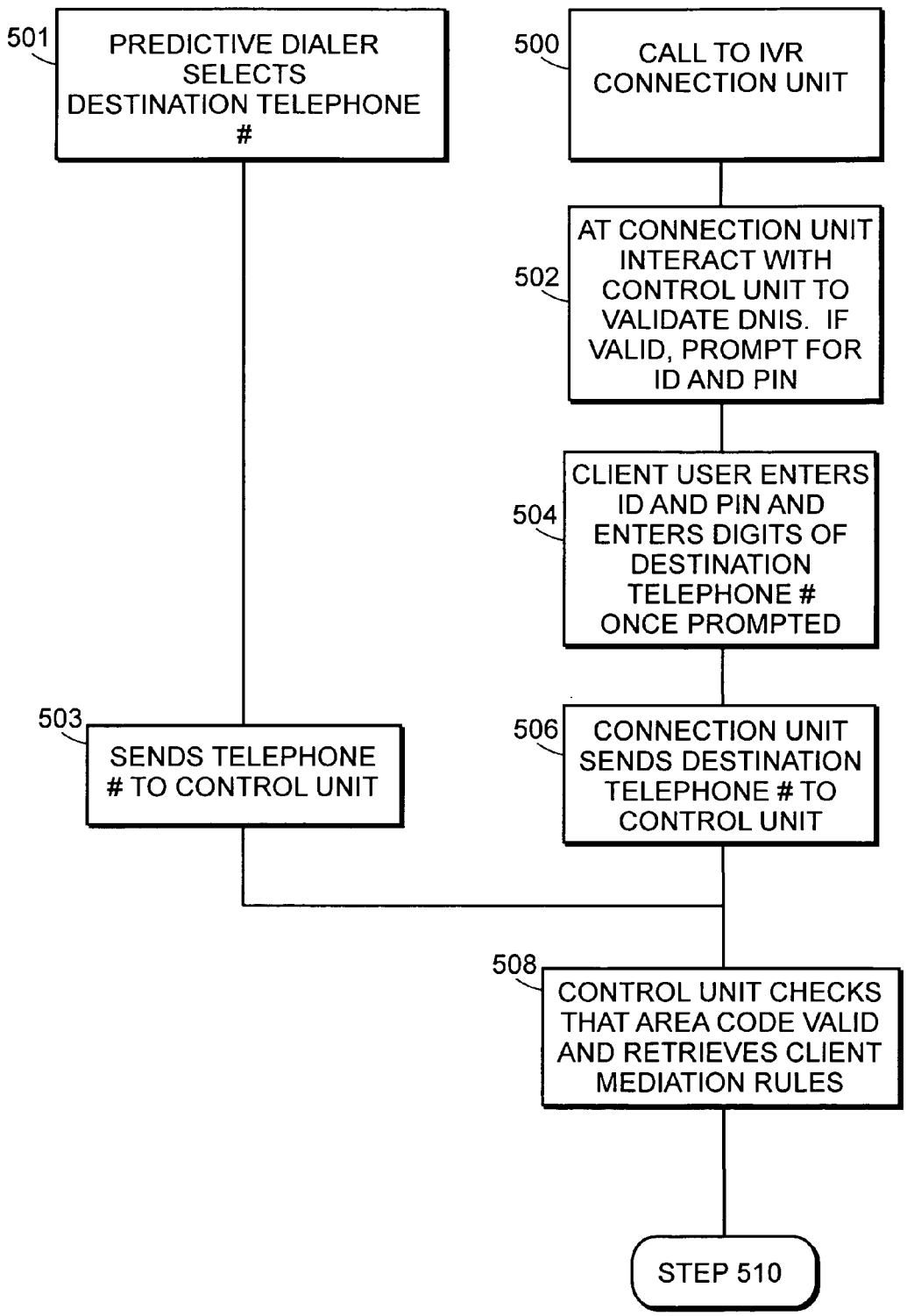
FIGS. 5A-5C is a flow chart of a procedure for prohibiting or allowing a communications connection in accordance with principles of the invention.
Figure 5B:
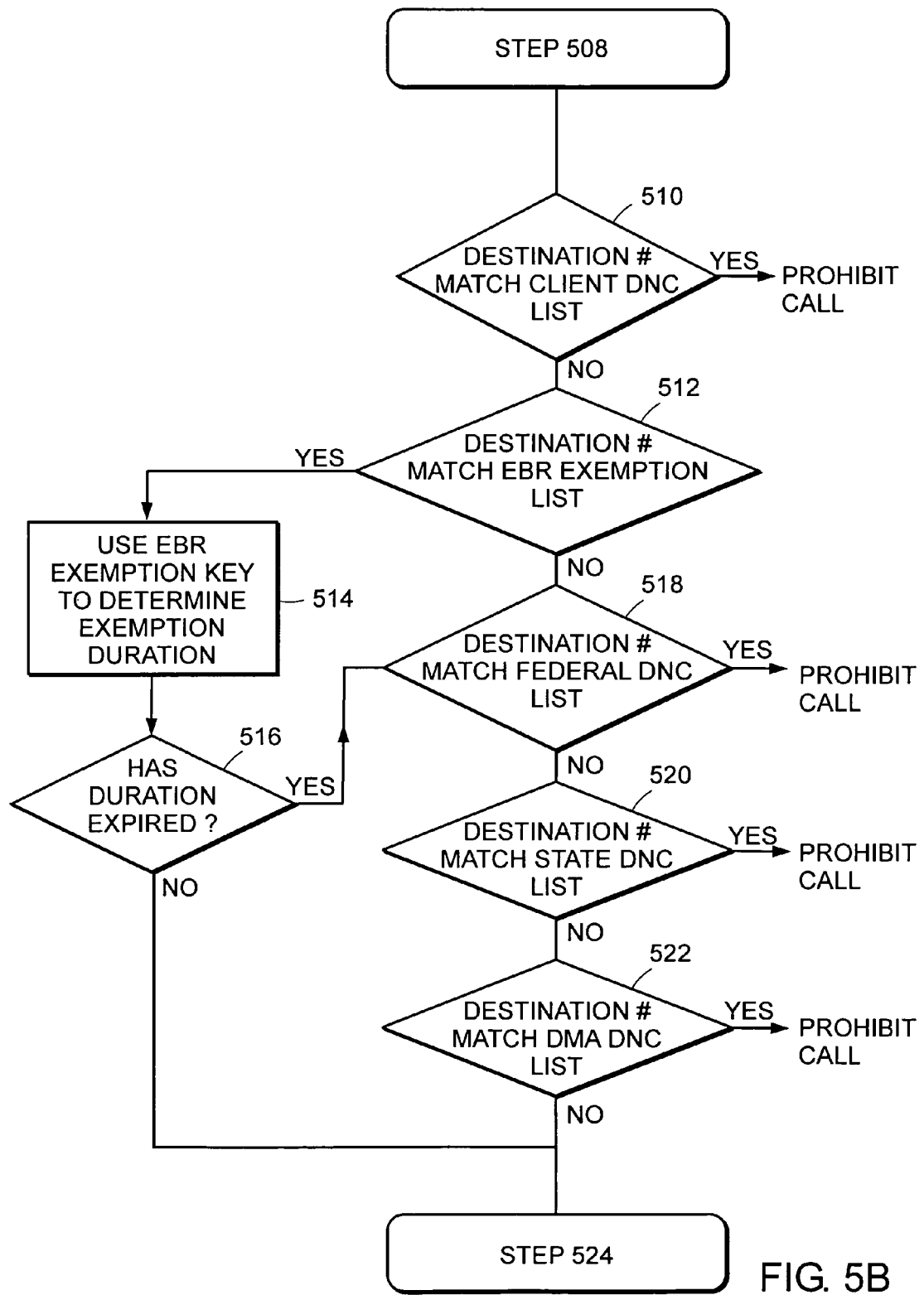
Figure 5C:
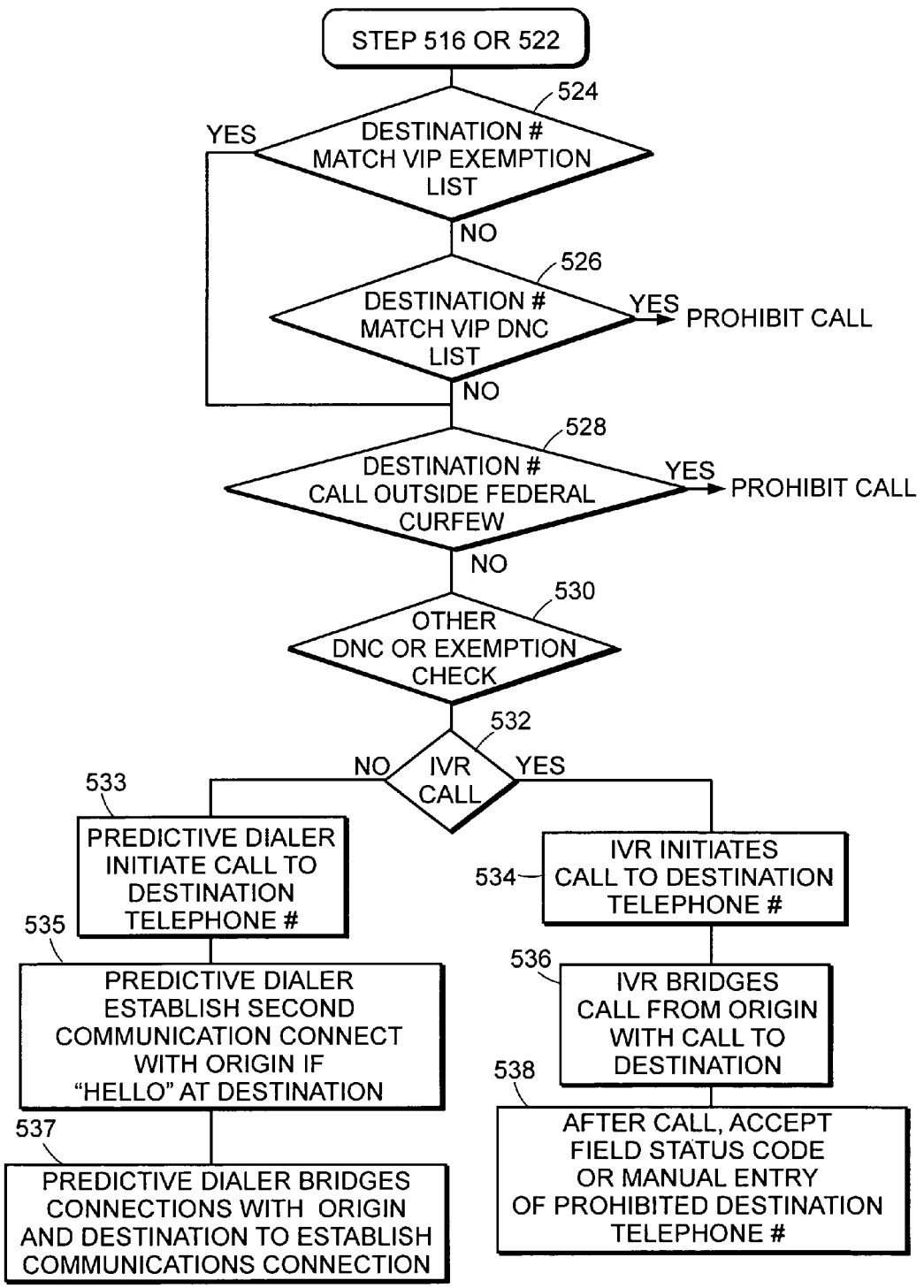

FIGS. 5A-5C illustrate one example process for selectively prohibiting a communications connection between, for example, origin 104-1 and destination 106-1 in a telecommunications network using PSTN 102 wherein origin 104-1 is a telephone having a user interface that accepts voice and dialed digits from a client agent. Initially, the agent calls IVR 116 at connection unit 114-1 to establish a communications connection with a connection unit 114-1 (Step 500). Connection unit 114-1 then interacts with a control unit 108-1 to validate the dialed number using DNIS. Upon successful validation by control unit 108-1, connection unit 114-1 prompts the client agent for identification and authentication information (Step 502). The prompt may be a voice recording or particular tone. Once prompted, the agent enters the identification and authentication information such as an agent identifier and PIN or client office identifier. Again, control unit 108-1 validates the identification and authentication information. Upon successful validation by control unit 108-1, IVR 116 of connection unit 114-1 prompts the agent for the destination telephone number. Further details regarding the initial steps of this process are provided in International Patent Application PCT/US03/19145. The client agent enters the digits associated with a destination telephone number (Step 504). The connection unit 114-1 then sends the destination telephone number to the control unit 108-1 (Step 506). Control unit 108-1 verifies that the dialed area code of the destination telephone number is valid and retrieves client-specific mediation rules (Step 508).

Control unit 108-1 prohibits or allows the communications connection based on the mediation rules, one or more prohibited destination number lists, and one or more exempted destination number lists, by sending a prohibit or allow order to the connection unit 114-1 based on the following sequence of checks. The destination telephone number is compared with client DNC list 208. If there is a match, control unit 108-1 orders connection unit 114-1 to prohibit the call (Step 510). If there is no match, the destination telephone number is compared with EBR exemption list 216 (Step 512). If there is a match, the EBR exemption key is checked to determine the category of exemption and the duration of time that the category of exemption is valid (Step 514). Control unit 108-1 also checks the date of contact and compares it with the current date to determine whether the exemption duration has expired. If the duration has expired, control unit 108-1 returns to checking the Federal, State, and DMA DNC lists. If the duration has not expired, control unit 108-1 either ignores or bypasses the checks of the Federal, State, and DMA DNC lists (Step 516).

If the destination telephone number does not match a number in EBR exemption list 216, the destination telephone number is compared with the Federal DNC list 200 (Step 518). If there is a match, the call is prohibited. If there is no match, the destination telephone number is compared with the designated state lists with State DNC list 202 (Step 520). If there is a match, the call is prohibited. If there is no match, the destination telephone number is compared with the DMA DNC list 204 (Step 522). If there is no match, the destination telephone number is compared with VIP exemption list 222 (Step 524). The VIP exemption list may be agent specific. If there is a match, the VIP DNC check is bypassed or ignored. If there is no match, the destination telephone number is compared with the VIP DNC list 210 (Step 526). If there is a match, the call is prohibited. If there is no match, the destination telephone number is compared with a Federal Curfew to determine whether the time of day (TOD) of the current call is within the federal government curfew times at the destination (Step 528). If the State Curfew were selected in the mediation rules, a State curfew check would have been made also. If the time is inside the allowed curfew period, for example 9 a.m. to 7 p.m., the call is not prohibited and other exemption checks or do-not-call checks may be made as defined by the mediation rules (Step 530).

Once control unit 108-1 completes all comparisons of the destination telephone number based on the mediation rules and the destination number has been allowed, control unit 108-1 orders connection unit 114-1 to allow the communications connection whereupon IVR 116 of connection unit 114-1 initiates a communications connection to destination 106-1 using the destination telephone number (Step 534). Connection unit 114-1, using IVR 116, then bridges the call from origin 104-1 with the call to destination 106-1 (Step 536). After the call is completed, IVR 116 may accept field status codes or manual entry of a prohibited destination telephone number for addition to client DNC list 208 (Step 538). Further details regarding the status codes or manual entry are provided in International Patent Application PCT/US03/19145.

If control unit 108-1 completes all comparisons of the destination telephone number based on the mediation rules and determines that the communications connection is prohibited, control unit 108-1 orders IVR 116 of switch 114-1 to end or disconnect the communications connection with origin 104-1. Instead of ending the connection with origin 104-1, IVR 116 may notify the client agent at origin 104-1 that the call is prohibited and prompt the agent for entry of another destination telephone number. The next destination telephone number may then be checked using the process described above.

The preceding steps associated with a call initiated to IVR 116 are similar to the steps involving a predictive dialer such as connection unit 114-2. A predictive dialer is a device or system that continuously initiates calls to destinations 106 and establishes a connection with an origin such as origin 104-9 only after establishing a connection with a destination such as 106-1. Thus, as shown in FIG. 5A, connection unit 114-2, a predictive dialer, initially selects a destination telephone number (Step 501). Connection unit 114-2 then send the destination telephone number to control unit 108-2 for permission to prohibit or allow a communications connection between, for example, origin 104-9 and destination 106-1. Control unit 114-2 then performs the same or similar sequence of checks as control unit 114-1 performed previously to prohibit or allow the communications connection between origin 104-1 and 106-1. If the destination telephone number is allowed, control unit 108-2 orders connection unit 114-2 to allow the communications connection between origin 104-9 and destination 106-1.

Connection unit 114-1 then initiates a call to destination 106-1 using the destination telephone number (Step 533). If connection unit 114-2 detects a "Hello" from destination 106-1, connection unit 114-2 establishes a second connection with origin 104-9 (Step 535). Connection unit 114-2 then bridges the connections with origin 104-9 and 106-1 to establish a communications connection between them.

Referring again to FIG. 1, as an alternative approach to performing real-time or near real-time call control as described above, an analysis system may be used to selectively designate whether a communications connections between an origin and one or more destinations are prohibited. The analysis system typically includes an interface unit that receives one or more proposed destination identifiers. The analysis system also includes at least one list of prohibited destination identifiers, at least one list of exempted destination identifiers, and an analysis unit 128 that designates whether the communication connection between an origin and one or more proposed destinations are prohibited or allowed based on one or more mediation rules and the list of prohibited and exempted destination identifiers.

The functional capabilities of analysis units 128 may be identical to control units 108 except that analysis units 128 do not control a communication connection or connection units 114. In fact, control units 108 may also function as analysis units. Instead of performing a real-time action, analysis units 128 may designate which destinations 106 may be connected with which origins 104. This designation of prohibited or allowed communications connections may entail analyzing a certified list of proposed destination identifiers delivered to the analysis unit via an interface unit such as personal computer 130. Computer 130 may also have an application that streamlines the information sent to analysis unit 128-1 such that private information associated with a destination is not potentially exposed in transmission to analysis unit 128-1. The interface unit could also be a ftp server, an database connection, a remote terminal connection, a WWW page, or Interactive Voice Response connection residing within analysis unit 128-1 or another server such as communications server 132.

After designating which communications connections are prohibited and allowed, analysis unit 128-1 may send a designation list to the client computer 130. Alternatively, analysis unit 128-2 may be implemented as a software application within a remote client computer 130. Thus, analysis unit 128-2 remotely accesses the prohibited and exempted lists of database 110-3 within a central administration facility. Personal computer 130 may also contain a database 110 that eliminates the need for analysis unit 128-2 to remotely access other databases such as database 110-3.

According to the foregoing, the present approach provides a method of selectively designating whether communications connections between an origin and one or more destinations in a communications network are prohibited. The method includes receiving one or more destination identifiers and designating whether the communications connection between the origin 104 and one or more destinations 106 are prohibited or allowed based on one or more mediation rules and lists of prohibited and exempted destination identifiers.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention encompassed by the appended claims.

For example, in the foregoing description of the invention and various embodiments thereof, the term "communications connection" is intended to include circuit-switched communications, packet-switched communications, communications using connectionless protocols such as IP, virtual circuit, or another other electronic communications between an origin and destination.

What is claimed is:

1. A control system for selectively prohibiting a communications connection between an origin and destination within a communications network, the system comprising:
   at least one list of prohibited destination identifiers;
   at least one list of exempted destination identifiers including a date of contact associated with each exempted destination identifier, the date of contact corresponding to a business transaction or inquiry made by a customer associated with the exempted destination identifier; and
   a control unit that selects one of prohibiting and allowing the communications connection between the origin and destination based on one or more mediation rules and the lists of prohibited and exempted destination identifiers, the control unit determining whether to apply a particular exemption to allow the communications connection depending on a duration that the particular exemption is valid from the date of contact.

2. The system according to claim 1 wherein the origin and destination are each a communications device directly or indirectly connected to the communications network.

3. The system according to claim 2 wherein the communications device is any one of a telephone, cellular telephone, personal digital assistance, pager, computer, client interface, and remote computer terminal.

4. The system according to claim 1 further comprising a connection unit that receives or initiates a request for a communications connection between an origin and destination, the request including the destination identifier; the connection unit capable of sending a request to the control unit and receiving an order from the control unit to prohibit or allow the communications connection.

5. The system according to claim 4 wherein the connection unit is any one of an Interactive Voice Response application, a predictive dialer server, a distributed predictive dialer system, a switch, router, and an electronic mail server.

6. The system according to claim 4 wherein the connection unit establishes a communications connection between an origin and destination.

7. The system according to claim 1 wherein the destination identifier is a communications device address.

8. The system according to claim 7 wherein the device address is any one of a telephone number, Internet Protocol address, Internet Domain Name, and an electronic mail address.

9. The system according to claim 1 wherein the lists are contained within one or more tables of one or more databases.

10. The system according to claim 1 wherein the lists of prohibited destination identifiers are derived from any one or a combination of a Federal Do-Not-Call list, a State Do-Not-Call list, a DMA list, Wireless do-Not-Call list, a client internal list, and a Very Important Person list.

11. The system according to claim 1 wherein the lists of exempted destination identifiers are derived from any one or a combination of an Existing Business Relationship (EBR) exemption list, Do-Not-Call exemption lists, State Do-Not-Call exemption list, a VIP exemption list, and other exemption list.

12. The system according to claim 1 wherein the mediation rules comprise a sequence of comparisons made between a destination identifier and one or more lists of exempted and prohibited identifiers.

13. The system according to claim 12 wherein each comparison with a list of exempted identifiers determines whether the comparison with an associated list or lists of prohibited destination identifiers is bypassed or ignored.

14. The system according to claim 1 wherein the prohibited and exempted destination lists are capable of being modified from the origin.

15. The system according to claim 1 wherein the prohibited and exempted destination lists are capable of being modified from a secondary interface.

16. The system according to claim 1 wherein the control unit is a computer server that resides on the premises of any one of a client, a local exchange carrier, local administration facility, central administration facility, and other remote facility.

17. The system according to claim 16 wherein the control unit interfaces with local prohibited and exempted destination lists; the local prohibited and exempted destination lists being periodically synchronized with other prohibited and exempted destination lists; the other prohibited and exempted destination lists being remotely located at another facility such as a local administration facility, local exchange carrier, central administration facility, or other facility.

18. The system according to claim 1 wherein the control unit within a client computer remotely accesses the prohibited and exempted lists within a central administration facility.

19. The system according to claim 1 wherein prohibited and exempted destination lists may be dynamically added or removed and the mediation rules updated to flexibly adapt the system to continuously support new connection prohibition rules.

20. The system according to claim 1 wherein a plurality of destination identifiers are examined in relation to a particular origin to determine whether to prohibit or allow a communications connection between the origin and each destination of the plurality of destinations.

21. The system according to claim 1 wherein a client user is identified and authenticated.

22. The system according to claim 1 wherein the control unit, based on the mediation rules, uses additional client and customer information to determine whether to prohibit or allow a communications connection.

23. The system according to claim 22 wherein the information includes any one or combination of a client user identifier, client identifier, customer identifier, client office identifier, product identifier, geographic area, date, time, exemption type duration, origin identifier, internal client criteria, and internal customer criteria.

24. The system according to claim 1 wherein logs of prohibited, allowed, and improper destination identifiers or a combination thereof are generated.

25. A method of selectively prohibiting a communications connection between an origin and destination in a communications network, the method comprising:
receiving or initiating a connection request for a communications connection between an origin and destination, the request including the destination identifier; and
selecting one of prohibiting and allowing the requested communications connection based on one or more mediation rules and lists of prohibited and exempted destination identifiers including a date of contact associated with each exempted destination identifier, the date of contact corresponding to a business transaction or inquiry made by a customer associated with the exempted destination identifier, allowing including determining whether to apply a particular exemption to allow the communications connection depending on a duration that the particular exemption is valid from the date of contact.

26. The method according to claim 25 wherein the origin and destination are each a communications device connected directly or indirectly to the communications network.

27. The method according to claim 26 wherein the communications device is any one of a telephone, cellular telephone, personal digital assistance, pager, computer, computer client interface, and remote computer terminal.

28. The method according to claim 25 wherein the receiving or initiating of a request is performed by a connection unit.

29. The method according to claim 28 wherein the connection unit is any one of an Interactive Voice Response application, a predictive dialer server, a distributed predictive dialer system, a switch, router, and an electronic mail server.

30. The method according to claim 29 wherein the connection unit establishes a communications connection between an origin and destination.

31. The method according to claim 25 wherein the destination identifier is a communications device address.

32. The method according to claim 31 wherein the device address is any one of a telephone number, Internet Protocol address, Internet Domain Name, and an electronic mail address.

33. The method according to claim 25 wherein the lists are contained within one or more tables of one or more databases.

34. The method according to claim 25 wherein the lists of prohibited destination identifiers are derived from any one or a combination of a Federal Do-Not-Call list, a State Do-Not-Call list, a DMA list, a Wireless do-Not-Call list, a client internal list, and a Very Important Person list.

35. The method according to claim 25 wherein the lists of exempted destination identifiers are derived from any one or a combination of an Existing Business Relationship (EBR) exemption list, Do-Not-Call exemption lists, State Do-Not-Call exemption list, a VIP exemption list, and other exemption list.

36. The method according to claim 25 wherein the mediation rules comprise a sequence of comparisons made between a destination identifier and one or more lists of exempted and prohibited identifiers; each comparison with a list of exempted identifiers determining whether comparison with an associated list or lists of prohibited destination identifiers is bypassed or ignored.

37. The method according to claim 25 wherein the prohibited and exempted destination lists are capable of being modified from the origin.

38. The method according to claim 25 wherein the prohibited and exempted destination lists are capable of being modified from a secondary interface.

39. The method according to claim 25 wherein the receiving, prohibiting, or allowing are performed within a computer server that resides on the premises of any one of a client, a local exchange carrier, local administration facility, central administration facility, and other remote facility.

40. The method according to claim 39 further comprising interfacing with local prohibited and exempted destination lists; the local prohibited and exempted destination lists being periodically synchronized with other prohibited and exempted destination lists; the other prohibited and exempted destination lists being remotely located at another facility such as a local administration facility, local exchange carrier, central administration facility, or other facility.

41. The method according to claim 25 further comprising remotely accessing the prohibited and exempted lists within a central administration facility.

42. The method according to claim 25 wherein prohibited and exempted destination lists may be dynamically added or removed and the mediation rules updated to flexibly adapt the system to continuously support new connection prohibition rules.

43. The method according to claim 25 further comprising examining a plurality of destination identifiers in relation to a particular origin to determine whether to prohibit or allow a communications connection between the origin and each destination of the plurality of destinations.

44. The method according to claim 25 further comprising identifying and authenticating a client user.

45. The method according to claim 25 wherein prohibiting or allowing is further based on client and customer information.

46. The method according to claim 45 wherein the information includes any one or combination of a client user identifier, client identifier, customer identifier, product identifier, client office identifier, geographic area, date, time, exemption type duration, origin identifier, internal client criteria, and internal customer criteria.

47. The method according to claim 25 further comprising generating logs of prohibited, allowed, and improper destination identifiers or a combination thereof.

48. A computer readable medium having computer readable program codes embodied therein for causing a computer to function as a control unit that selectively prohibits a communications connection between an origin and destination in a communications network, the computer readable medium program codes performing functions comprising:
receiving or initiating a connection request for a communications connection between an origin and destination, the request including the destination identifier; and
selecting one of prohibiting and allowing the requested communications connection based on one or more mediation rules and lists of prohibited and exempted destination identifiers, including a date of contact associated with each exempted destination identifier, the date of contact corresponding to a business transaction or inquiry made by a customer associated with the exempted destination identifier, allowing including determining whether to apply a particular exemption to allow the communications connection depending on a duration that the particular exemption is valid from the date of contact.

49. An analysis system for selectively designating whether a communications connections between an origin and one or more destinations are prohibited, the system comprising:
an interface unit that receives one or more proposed destination identifiers;
at least one list of prohibited destination identifiers;
at least one list of exempted destination identifiers including a date of contact associated with each exempted destination identifier, the date of contact corresponding to a business transaction or inquiry made by a customer associated with the exempted destination identifier; and
an analysis unit that designates whether the communications connection between an origin and one or more proposed destinations is one of prohibited and allowed based on one or more mediation rules and the lists of prohibited and exempted destination identifiers, the analysis unit determining whether to apply a particular exemption to allow the communications connection depending on a duration that the particular exemption is valid from the date of contact.

50. The system according to claim 49 wherein the origin and destination are each a communications device connected to the communications network.

51. The system according to claim 50 wherein the communications device is any one of a telephone, cellular telephone, personal digital assistance, pager, computer, computer client interface, and remote computer terminal.

52. The system according to claim 49 wherein the identifier is a communications device address.

53. The system according to claim 52 wherein the device address is any one of a telephone number, Internet Protocol address, Internet Domain Name, and an electronic mail address.

54. The system according to claim 49 wherein the lists are contained within one or more tables of one or more databases.

55. The system according to claim 49 wherein the lists of prohibited destination identifiers are derived from any one or a combination of a Federal Do-Not-Call list, a State Do-Not-Call list, a DMA list, a Wireless do-Not-Call list, a client internal list, and a Very Important Person list.

56. The system according to claim 49 wherein the lists of exempted destination identifiers are derived from any one or a combination of an Existing Business Relationship (EBR) exemption list, Do-Not-Call exemption lists, State Do-Not-Call exemption list, a VIP exemption list, and other exemption list.

57. The system according to claim 49 wherein the mediation rules comprise a sequence of comparisons made between a destination identifier and one or more lists of exempted and prohibited identifiers.

58. The system according to claim 57 wherein each comparison with a list of exempted identifiers determines whether the comparison with an associated list or lists of prohibited destination identifiers is bypassed or ignored.

59. The system according to claim 49 wherein the prohibited and exempted destination lists are capable of being modified from the origin.

60. The system according to claim 49 wherein the prohibited and exempted destination lists are capable of being modified from a secondary interface.

61. The system according to claim 49 wherein the analysis unit within a client computer remotely accesses the prohibited and exempted lists within a central administration facility.

62. The system according to claim 49 further comprising a client computer that remotely sends a certified list of proposed destination identifiers to the analysis unit whereupon the analysis unit designates prohibited and allowed destination identifiers and sends a designation list to the client computer.

63. The system according to claim 49 wherein prohibited and exempted destination lists may be dynamically added or removed and the mediation rules updated to flexibly adapt the system to continuously support new connection prohibition rules.

64. The system according to claim 49 wherein the analysis unit, based on the mediation rules, uses additional client and customer information to designate a prohibited or allowed communications connection.

65. The system according to claim 64 wherein the information includes any one or combination of a client user identifier, client identifier, customer identifier, product identifier, client office identifier, geographic area, date, time, exemption type duration, origin identifier, internal client criteria, and internal customer criteria.

66. The system according to claim 49 wherein logs of prohibited, allowed, and improper destination identifiers or a combination thereof are generated.

67. The system according to claim 49 wherein the interface unit is any one of a World Wide Web page, a ftp server, an database connection, a remote terminal connection, and Interactive Voice Response connection.

68. A method of selectively designating whether communications connections between an origin and one or more destinations in a communications network are prohibited, the method comprising:
receiving one or more destination identifiers; and
designating whether the communications connection between the origin and one or more destinations is one of prohibited and allowed based on one or more mediation rules and lists of prohibited and exempted destination identifiers, including a date of contact associated with each exempted destination identifier, the date of contact corresponding to a business transaction or inquiry made by a customer associated with the exempted destination identifier, designating including determining whether to apply a particular exemption to allow the communications connection depending on a duration that the particular exemption is valid from the date of contact.

69. The method according to claim 68 wherein the origin and destination are each a communications device connected to the communications network.

70. The method according to claim 69 wherein the communications device is any one of a telephone, cellular telephone, personal digital assistance, pager, computer, computer client interface, and remote computer terminal.

71. The method according to claim 68 wherein the identifier is a communications device address.

72. The method according to claim 71 wherein the device address is any one of a telephone number, Internet Protocol address, Internet Domain Name, and an electronic mail address.

73. The method according to claim 68 wherein the lists are contained within one or more tables or one or more databases.

74. The method according to claim 68 wherein the lists of prohibited destination identifiers are derived from any one or a combination of a Federal Do-Not-Call list, a State Do-Not- Call list, a DMA list, a Wireless do-Not-Call list, a client internal list, and a Very Important Person list.

75. The method according to claim 68 wherein the lists of exempted destination identifiers are derived from any one or a combination of an Existing Business Relationship (EBR) exemption list, Do-Not-Call exemption lists, State Do-Not-Call exemption list, a VIP exemption list, and other exemption list.

76. The method according to claim 68 wherein the mediation rules comprise a sequence of comparisons made between a destination identifier and one or more lists of exempted and prohibited identifiers; each comparison with a list of exempted identifiers determining whether comparison with an associated list or lists of prohibited destination identifiers is bypassed or ignored.

77. The method according to claim 68 wherein the prohibited and exempted destination lists are capable of being modified from the origin.

78. The method according to claim 68 wherein the prohibited and exempted destination lists are capable of being modified from a secondary interface.

79. The method according to claim 68 further comprising remotely accessing the prohibited and exempted lists within a central administration facility.

80. The method according to claim 68 further comprising receiving a certified list of proposed destination identifiers from a remote client computer and sending a designation list back to the client computer.

81. The method according to claim 68 wherein prohibited and exempted destination lists may be dynamically added or removed and the mediation rules updated to flexibly adapt the system to continuously support new connection prohibition rules.

82. The method according to claim 68 wherein designating prohibited or allowed communications connections is further based on client and customer information.

83. The method according to claim 82 wherein the information includes any one or combination of a client user identifier, client identifier, customer identifier, client office identifier, product identifier, geographic area, date, time, exemption type duration, origin identifier, internal client criteria, and internal customer criteria.

84. The method according to claim 68 further comprising generating logs of prohibited, allowed, and improper destination identifiers or a combination thereof.

85. The method according to claim 68 wherein the receiving of proposed destination identifiers is facilitated by any one of a World Wide Web page, a ftp server, an database connection, a remote terminal connection, and Interactive Voice Response connection.

86. A computer readable medium having computer readable program codes embodied therein for causing a computer to function as an analysis unit that selectively designates prohibited communications connections between an origin and one or more destinations in a communications network, the computer readable medium program codes performing functions comprising:
  receiving one or more destination identifiers; and
  designating whether the communications connections between the origin and one or more destinations is one of prohibited and allowed based on one or more mediation rules and lists of prohibited and exempted destination identifiers, including a date of contact associated with each exempted destination identifier, the date of contact corresponding to a business transaction or inquiry made by a customer associated with the exempted destination identifier, designating including determining whether to apply a particular exemption to allow the communications connections depending on a duration that the particular exemption is valid from the date of contact.

87. A method of selectively prohibiting a communications connection between an origin and destination in a telecommunications network, the origin having a user interface for a client agent, the destination having a destination telephone number, the method comprising:
  at the origin, establishing a communications connection with a connection unit;
  at the connection unit, interacting with a control unit to validate a dialed number and, upon successful validation by the control unit, prompting the client agent for identification and authentication information;
  at the origin, entering the identification and authentication information;
  at the connection unit, interacting with the control unit to validate the identification and authentication information and, upon successful validation by the control unit, prompting for the destination telephone number;
  at the origin, entering the digits associated with a destination telephone number;
  at the connection unit, sending the destination telephone number to the control unit;
  at the control unit,
    verifying that the dialed area code of the destination telephone number is valid;
    retrieving client-specific mediation rules;
    selecting one of prohibiting and allowing the communications connection based on the mediation rules, one or more prohibited destination number lists, and one or more exempted destination number lists, by sending a prohibit or allow order to the connection unit;
  at the connection unit if the communications connection is allowed, establishing a second communications connection with the destination and bridging the origin communications connection to the destination communications connection to establish a communications connection between origin and destination; and
  at the connection unit if the communications connection is prohibited, ending the communications connection with the origin or notifying the client agent that the call is prohibited and prompting for entry of another destination telephone number.

88. The method according to claim 87 wherein the mediation rules comprise a sequence of comparisons made between a destination identifier and one or more lists of exempted and prohibited identifiers; each comparison with a list of exempted identifiers determining whether comparison with an associated list or lists of prohibited destination identifiers is bypassed.

89. A system for selectively prohibiting a communications connection between an origin and destination in a communications network, the system comprising:
  means for receiving or initiating a connection request for a communication connection between an origin and destination, the request including the destination identifier; and
  means for selecting one of prohibiting and allowing the requested communications connection based on one or more mediation rules and lists of prohibited and exempted destination identifiers including a date of contact associated with each exempted destination identifier, the date of contact corresponding to a business transaction or inquiry made by a customer associated with the exempted destination identifier, including means for determining whether to apply a particular exemption to allow the communications connection depending on a duration that the particular exemption is valid from the date of contact.

90. A system for selectively designating whether communications connections between an origin and one or more destinations in a communications network are prohibited, the system comprising:

means for receiving one or more destination identifiers; and means for designating whether the communications connection between the origin and one or more destinations is one of prohibited and allowed based on one or more mediation rules and lists of prohibited and exempted destination identifiers, including a date of contact associated with each exempted destination identifier, the date of contact corresponding to a business transaction or inquiry made by a customer associated with the exempted destination identifier, including means for determining whether to apply a particular exemption to allow the communications connection depending on a duration that the particular exemption is valid from the date of contact.

91. The system according to claim 1 wherein the mediation rules are specific to a particular client.

92. The method according to claim 25 wherein the mediation rules are specific to a particular client.

93. The system according to claim 49 wherein the mediation rules are specific to a particular client.

94. The method according to claim 68 wherein the mediation rules are specific to a particular client.

95. The method according to claim 87 wherein the mediation rules are specific to a particular client.

* * * * *